UNITED STATES PATENT OFFICE.

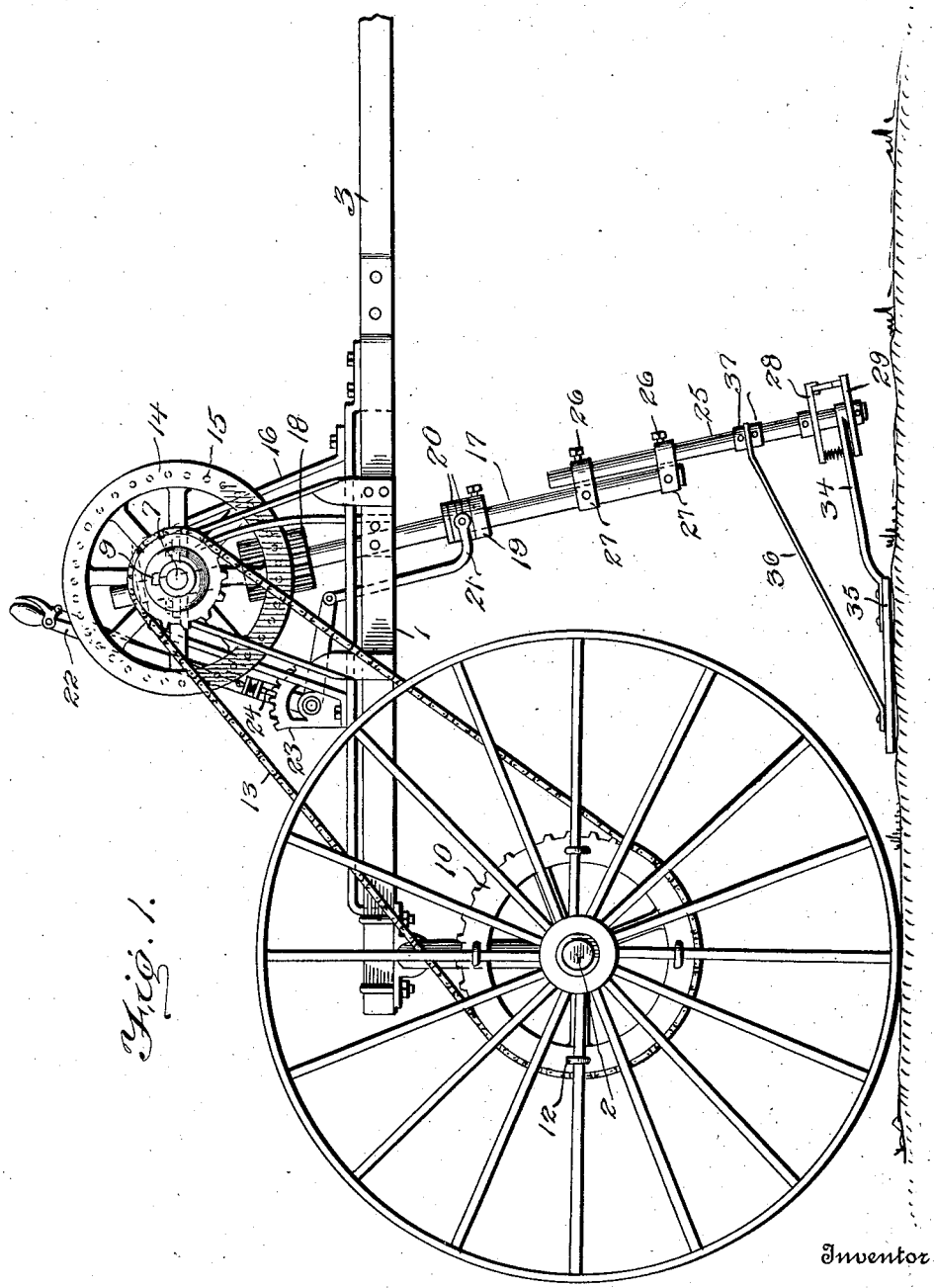

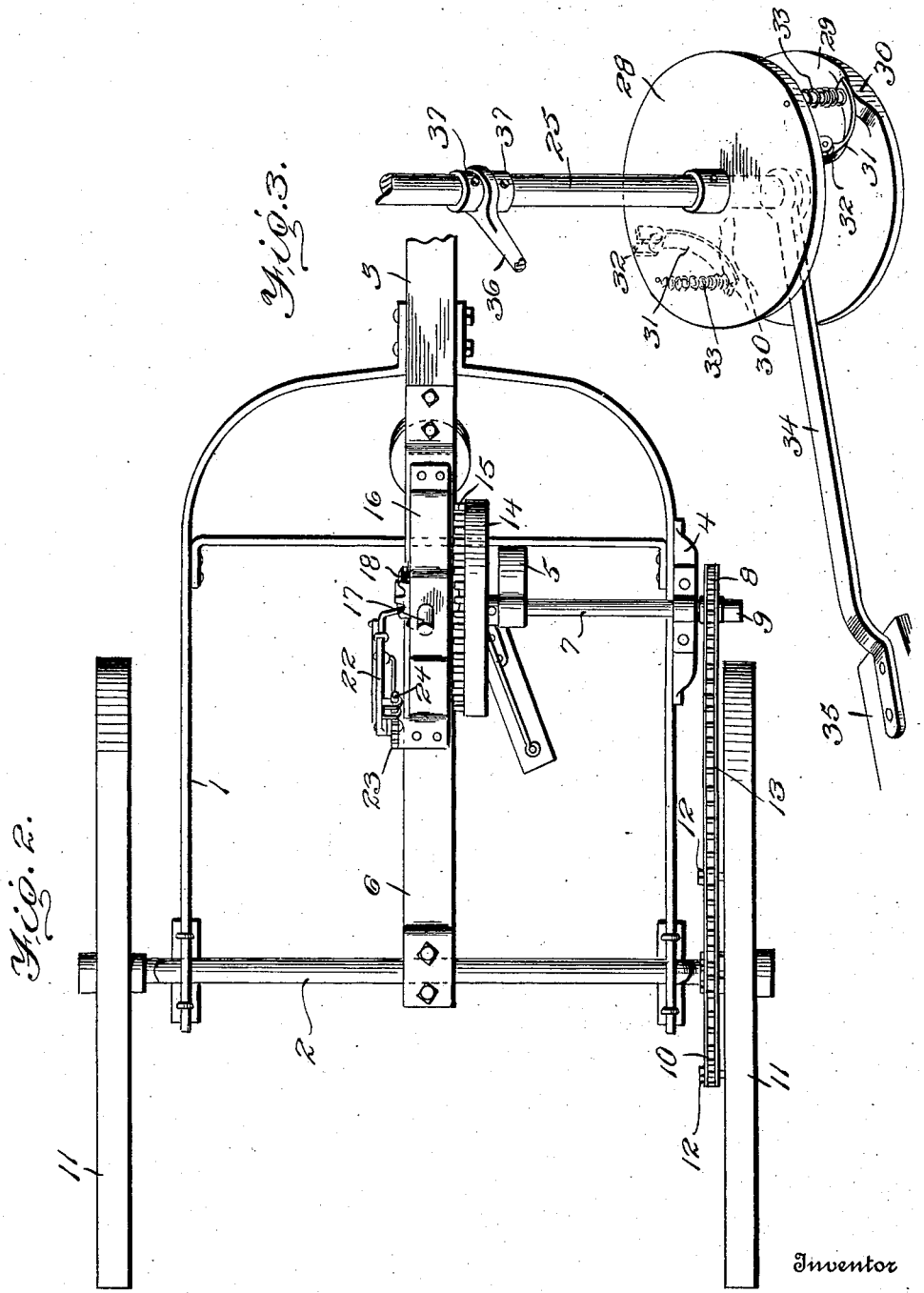

CHARLES W. MATHUS, OF WICHITA FALLS, TEXAS.

COTTON-CHOPPER ATTACHMENT.

1,024,799.  Specification of Letters Patent.  Patented Apr. 30, 1912.

Application filed October 3, 1911.  Serial No. 652,615.

*To all whom it may concern:*

Be it known that I, CHARLES W. MATHUS, citizen of the United States, residing at Wichita Falls, in the county of Wichita and State of Texas, have invented certain new and useful Improvements in Cotton-Chopper Attachments, of which the following is a specification.

This invention relates to cotton chopper attachments for cultivator frames, and has for its object to provide an attachment of simple structure which may be easily and quickly applied to the frame of a cultivator or detached from the same.
With this object in view the attachment includes brackets adapted to be secured to one side and to the intermediate portion of the cultivator frame and which support a shaft. Means is provided for rotating said shaft from one of the wheels of the cultivator. A wheel carrying a series of pins is fixed to the inner end of the said shaft. A forwardly and downwardly disposed shaft is journaled for rotation under the frame of the cultivator. Means is provided for raising and lowering the last-mentioned shaft and the last-mentioned shaft carries at its upper end a gear wheel which meshes with the said pins. At its lower end the last-mentioned shaft carries a resiliently supported blade which is adapted to rotate about the axis of the last-mentioned shaft and accomplish the cutting operation as will be explained hereinafter.
For a full understanding of the invention reference is to be had to the following description and accompanying drawings, in which:

Figure 1 is a side elevation of the cotton chopper; Fig. 2 is a top plan view of the same; Fig. 3 is a detail perspective view of a portion of the same.

Corresponding and like parts are referred to in the following description and indicated in all the views of the accompanying drawings by the same reference characters.

The cultivator to which the attachment is applied consists of a frame 1 supported upon an axle 2 and having a tongue 3 connected therewith in the usual manner. A bracket 4 is secured at one side of the frame 1 and a bracket 5 is connected to the intermediate portion of the rear frame. The intermediate portion of the tongue is also connected by a bar with the intermediate portion of the axle 2. A shaft 7 is journaled in the brackets 4 and 5 and carries at its outer end a sprocket wheel 8. The hub of the said sprocket wheel is provided with a set screw 9, whereby the said sprocket wheel may be adjusted along the outer end portion of the shaft 7 and secured in an adjusted position. A sprocket rim 10 is secured to the spokes of one of the supporting wheels 11 of the cultivator, which wheel is journaled upon one end of the axle 2 in the usual manner. The said rim 10 is held in position upon the spokes of the wheel 11 by means of clips 12 which straddle the spokes and which pass transversely through the rim and are secured thereto in any usual manner. A sprocket chain 13 is trained around the rim 10 and the sprocket wheel 8 and is adapted to transmit rotary movement from the wheel 11 through the sprocket wheel 8 to the shaft 7.

A wheel 14 is fixed to the inner end of the shaft 7 and is provided upon one side with a series of outstanding pins 15. A standard 16 is carried by the plate 6 and a shaft 17 is slidably journaled at its upper end portion through the said standard 16. The shaft 17 is forwardly and downwardly inclined and is disposed approximately at an angle of ten degrees to the surface of the ground when the parts are in operation. A gear wheel 18 is fixed to the upper end portion of the shaft 16 and meshes with the pins 15. This wheel 18 is of considerable thickness in a direction longitudinally of the shaft 17, and consequently may be moved together with the shaft 17 and at the same time remain in mesh with the pins 15. A collar 19 is fixed to the intermediate portion of the shaft 17 and a sleeve 20 surrounds the said collar. A yoke 21 is connected at its lower end with the sleeve 20 and at its upper end with the working end of a lever 22 which is fulcrumed upon the bar 6. A segment 23 is also mounted upon the said bars adjacent the lever 22 and is adapted to be engaged by a spring pawl 24 carried by the said lever.

By swinging the lever 22 the yoke 21 is moved longitudinally, whereby the shaft 17 may be raised or lowered to a desired extent. The shaft 17 may be raised to such an extent that the wheel 18 is carried above the lowermost pins 15 of the set of pins carried by the wheel 14 and thus the said wheel may continue to rotate, but the wheel 18 and its attached shaft 17 will come to a state of rest.

Collars 27 are carried by the shaft 17, and adjustably engaging the collars is a bar 25, the collars being provided with set screws 26 to couple the bar to the shaft at any desired point. At its lower end the bar 25 is provided with two disks 28—29 spaced apart. The lower disk 29 is provided with upwardly directed diagonally opposite projections 30, while the upper disk 28 is provided with curved bars 31 hinged at 32 to the upper disk. The bars 31 are maintained yieldably with their free ends in normal contact with the projections 30 by springs 33. An arm 34 is journaled upon the bar 25 between the disks 28—29 and is provided with a cutting blade 35 at its outer end. The blade is supported from the bar 25 by a brace 36 which is journaled between stop collars 37 on the bar. By this arrangement as the shaft 17 and its connected bar 25 are rotated the blade 35 will be rotated therewith.

Inasmuch as the shaft 17 is inclined forwardly and downwardly, the bar 25 has a similar inclination, and the blade 35 is positioned at such an angle with relation to the bar 25 that when it is behind the bar it is in a position approximately parallel with the surface of the soil, but when it is in front of the bar it is at a decided angle with relation to the surface of the soil.

In operation, the cultivator frame with the attachment applied is moved along a row of standing plants, and as the bar 25 rotates the blade 35 is carried around and as it crosses the line of draft of the machine behind the bar 25 it comes in contact with the plants standing in the row and chops the same out. As the said blade 35 swings around in front of the bar 25 it is lifted above the standing plants by the arm 34 which is also turning with the bar 25 and therefore as it crosses in front of the bar 25 it does not encounter the plants. As the blade 35 strikes the plants or surface of the ground behind the bar 25, the spring 33 will give sufficiently to prevent the force of impact between the blade and the ground from jarring or subjecting the attachment to pounding. By adjusting the lever 22 and at the same time permitting the gear wheel 18 to remain in mesh with the pin 15 the blade may be caused to cut deep or shallow in the soil, as desired, and by moving the lever 22 so that the wheel 18 is carried out of mesh or above the pins 15 the blade 35 will come to a state of rest and thus the chopping operation is interrupted.

When the blade 35 comes in contact with the ground or the plants one of the bars 31 and the projection under the same are in contact with the arm 34 and inasmuch as the bar 31 may swing against the tension of the spring 33 the blade will cut out the plants with a yielding stroke which will avoid excessive jarring of the attachment. If, however, the blade should strike an obstruction in the ground through which it could not penetrate, the spring 33 will yield sufficiently to permit the bar 31 to swing away from the projection 30 so that the said bar and projection may pass by the bar 34 and the said bar will come to a state of rest while the bar 25 continues to turn. After the blade 35 has passed beyond the said obstruction the bar 34 is encountered by the other bar 31 and the projection 30 and the blade 35 will continue to operate so long as the conditions at the surface of the ground remain favorable.

Having thus described the invention what is claimed as new is:

In combination with a wheel mounted frame, a cotton chopper comprising a forwardly and downwardly disposed bar journaled for rotation, means for rotating the same, a resiliently supported blade carried at the lower end portion of the bar and arranged to approach the surface of the soil as it passes behind the bar and arranged to move away from the surface of the soil as it moves in front of the bar, and a brace connected at its outer end with the outer end of the blade and journaled at its inner end upon the bar, said bar carrying collars which receive said brace between them.

In testimony whereof I affix my signature in presence of two witnesses.

CHARLES W. MATHUS. [L. S.]

Witnesses:
 JAMES CHEATHAM,
 FRANK W. HOBSON.